United States Patent
Cho

(10) Patent No.: US 11,417,217 B2
(45) Date of Patent: Aug. 16, 2022

(54) SYSTEM, METHOD, INFRASTRUCTURE, AND VEHICLE FOR AUTOMATED VALET PARKING

(71) Applicants: HYUNDAI MOTOR COMPANY, Seoul (KR); KIA MOTORS CORPORATION, Seoul (KR)

(72) Inventor: Dae Gil Cho, Suwon-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 298 days.

(21) Appl. No.: 16/728,857

(22) Filed: Dec. 27, 2019

(65) Prior Publication Data

US 2020/0211400 A1 Jul. 2, 2020

(30) Foreign Application Priority Data

Dec. 28, 2018 (KR) .................. 10-2018-0172790

(51) Int. Cl.
| | |
|---|---|
| G08G 1/00 | (2006.01) |
| G01C 21/34 | (2006.01) |
| G05D 1/00 | (2006.01) |
| G05D 1/02 | (2020.01) |
| G08G 1/14 | (2006.01) |

(52) U.S. Cl.
CPC .......... *G08G 1/202* (2013.01); *G01C 21/3438* (2013.01); *G05D 1/0088* (2013.01); *G05D 1/0212* (2013.01); *G08G 1/146* (2013.01); *G08G 1/149* (2013.01); *G05D 2201/0213* (2013.01)

(58) Field of Classification Search
CPC ........ G08G 1/202; G08G 1/146; G08G 1/149; G05D 1/0088; G05D 2201/0213; G01C 21/3438
USPC .......................................................... 701/23
See application file for complete search history.

(56) References Cited

U.S. PATENT DOCUMENTS

| | | | | |
|---|---|---|---|---|
| 9,135,580 | B1* | 9/2015 | Lyman ................... | G06Q 10/02 |
| 2013/0231824 | A1* | 9/2013 | Wilson ............... | G01C 21/3415 |
| | | | | 701/26 |
| 2015/0285645 | A1* | 10/2015 | Maise ................ | B62D 15/0285 |
| | | | | 701/25 |
| 2015/0353080 | A1* | 12/2015 | Mukaiyama ............ | E05B 77/54 |
| | | | | 701/23 |
| 2017/0025004 | A1* | 1/2017 | Nordbruch ............... | G08G 1/04 |
| 2017/0329346 | A1* | 11/2017 | Latotzki ............... | G05D 1/0088 |
| 2018/0267541 | A1* | 9/2018 | Goldberg ............... | G06Q 50/30 |
| 2020/0207334 | A1* | 7/2020 | Cho .................... | B62D 15/0285 |
| 2021/0380096 | A1* | 12/2021 | Katoh ................... | B60W 30/06 |

OTHER PUBLICATIONS

Extended European Search Report cited in European application No. 19219828.1-1009; dated May 7, 2020; 10 pp.

* cited by examiner

*Primary Examiner* — Yazan A Soofi
(74) *Attorney, Agent, or Firm* — Lempia Summerfield Katz LLC

(57) ABSTRACT

A system, method, infrastructure, and vehicle for performing automated valet parking enable an unmanned vehicle to autonomously move to and park at an empty parking space by communicating with a parking infrastructure. The system, method, infrastructure, and vehicle enable an unmanned vehicle to autonomously move from a parking space to a pickup zone by communicating with a parking infrastructure.

15 Claims, 10 Drawing Sheets

| Step | Infra | Vehicle |
|---|---|---|
| <1> AVPS START | • Recognize and qualify an appropriate user (by user ID and PIN) and vehicle (by unique number assigned to vehicle)<br>• Manage driving authority (receiving driving authority from the user/return the driving authority to the user)<br>• Transmit automated driving start instruction to vehicle | • Perform engine ON/OFF or power ON/OFF according to the instruction of infra<br>• Lock the vehicle according to the instruction of infra |
| <2> DETERMINATION OF TARGET POSITION AND GUIDE ROUTE | • Determine the target position, guide route, and permissive driving area, and deliver these information to vehicle | |
| <3> AUTONOMOUS DRIVING | • Instruct automated driving (start, stop, re-start) to vehicle | • Drive along the guide route designated by infra within the permitted driving area at a speed of 10km/h or less<br>• Drive within the path and width designated by infra without deviation<br>• Drive along a curve with the minimum inner radius of the vent designated by the infra without deviation<br>• Drive on a path with the gradient less than or equal to the maximum gradient designated by infra |
| <4> POSITION MEASUREMENT (vehicle, obstacle) | • Be aware of and manage vehicle location<br>• Detect and recognize vehicles and obstacles (TBD) and monitor safety driving and parking operation of each vehicle (supervise) | • Estimate its own position<br>• Inform the infra of it's estimated position / with the accuracy and frequency specified below (TBD)<br>• Inform the infra of its own status<br>• Detect the following obstacles (TBD) |
| <5> AUTONOMOUS PARKING | | • Park and stop the vehicle at the target position designated by infra (equivalent to PA/PS parking requirements) |

Fig. 4A

| Step | Infra | Vehicle |
|---|---|---|
| <6> EMERGENCY BRAKE | • Continue to instruct automated driving to vehicle when safety is ensured as a result of safety confirmation, and to instruct the vehicle to perform an emergency stop, if safety is not confirmed | • Start/emergency stop/re-start automated driving according to the instruction of infra<br>• Perform an emergency stop in case where a potential hazard is determined as a result of the detection mentioned above<br>• Immediately decelerate at the rate of (TBD) m/s² and stop, when the following conditions are met<br>(1) vehicle received an instruction from infra for E/S<br>(2) vehicle detected an obstacle (TBD)<br>• After coming to a stop, the vehicle shall remain stopped until it receives an instruction from infra to resume automated driving<br>• Vehicle shall re-start suspended driving or parking when it receives an instruction to start automated driving from the infra after confirming that there is no obstacle ahead in the path |
| <7> AVPS END | • After the vehicle completes automated driving and parking, the infra transmits vehicle unusual release instruction to the vehicle | • Perform engine ON/OFF or power ON/OFF according to the instruction of infra<br>• Lock the vehicle according to the instruction of infra<br>• Mechanically fix or restrain wheels using such as the parking brake |
| <8> FAULT CONTROL (communication or vehicle fault) | • Detect communication faults between the infra and vehicle | • Detect faults in communication with infra during driving<br>• Detect vehicle's faults (e.g., part failure, human or animal intruding inside the vehicle, etc.)<br>• Perform emergency stop when above fault is detected<br>• After coming to a stop, the vehicle shall remain stopped until it receives an instruction from infra to resume automated driving |

SYSTEM, METHOD, INFRASTRUCTURE, AND VEHICLE FOR AUTOMATED VALET PARKING

CROSS REFERENCE TO RELATED APPLICATION

The present application claims priority to Korean Patent Application No. 10-2018-0172790, filed on Dec. 28, 2019, the entire contents of which are incorporated herein for all purposes by this reference.

BACKGROUND

1. Field of the Disclosure

The present disclosure relates to a system, method, infrastructure, and vehicle for performing automated valet parking. The present disclosure enables an unmanned vehicle to autonomously move to and park at an empty parking space by communicating with a parking infrastructure. The present disclosure enables an unmanned vehicle to autonomously move from a parking space to a pickup zone by communicating with a parking infrastructure.

2. Description of the Related Art

Many modern cities suffer from various parking-related issues. For example, there is a high risk of a car collision in a parking lot. For parking in crowded places such as large shopping centers, it takes a long time and much energy to park a vehicle due to traffic congestion before entering a parking lot. In addition, it takes a long time and much energy to locate an empty parking space even after entering a parking lot. In addition, there is inconvenience since the driver must move to a spot at which his or her vehicle is parked at the time of leaving the visited area. There is also inconvenience since the driver often has difficulty in retrieving his or her vehicle due to difficulty remembering the place where his or her vehicle is parked.

SUMMARY

The present disclosure has been made in view of the problems occurring in the related art. An objective of the present disclosure is to enable an automated valet parking service by which a driver can leave his or her vehicle at a predetermined drop-off zone and the vehicle, without the driver, autonomously moves to and parks at an empty parking space within a parking lot.

Another objective of the present disclosure is to enable an automated valet parking service by which a vehicle that has been parked autonomously moves from a parking space to a predetermined pickup zone so that the driver can conveniently leave the parking lot.

According to embodiments of the present disclosure, there is provided an apparatus for automated valet parking. The apparatus includes a processor configured to perform computations and a transceiver configured to transmit and receive data. The apparatus receives a pickup request, determines whether a pickup condition is satisfied after receiving the pickup request, and transmits a guide route that guides a vehicle from a parking space to a pickup zone when the pickup condition is satisfied.

According to embodiments of the present disclosure, there is provided an automated valet parking method performed using a parking infrastructure and a user terminal. The method includes: receiving, by the infrastructure, a pickup request; determining, by the infrastructure, whether a pickup condition is satisfied after receiving the pickup request; and transmitting, by the infrastructure, a guide route that guides a vehicle from a parking space to a pickup zone to the vehicle when the pickup condition is satisfied.

According to embodiments of the present disclosure, there is provided a computer program for executing the automated valet parking method according to the embodiments of the present disclosure. The computer program is stored in a computer-readable recording medium.

BRIEF DESCRIPTION OF THE DRAWINGS

The above and other objects, features and other advantages of the present disclosure should be more clearly understood from the following detailed description taken in conjunction with the accompanying drawings, in which:

FIGS. 4A and 4B are diagrams illustrating operations performed by a parking infrastructure and a vehicle for automated valet parking, according to an embodiment of the present disclosure;

FIG. 5 is a diagram illustrating a communication process performed by a vehicle and a parking infrastructure for automated valet parking according to an embodiment of the present disclosure;

DESCRIPTION OF THE EMBODIMENTS

Figure 1:
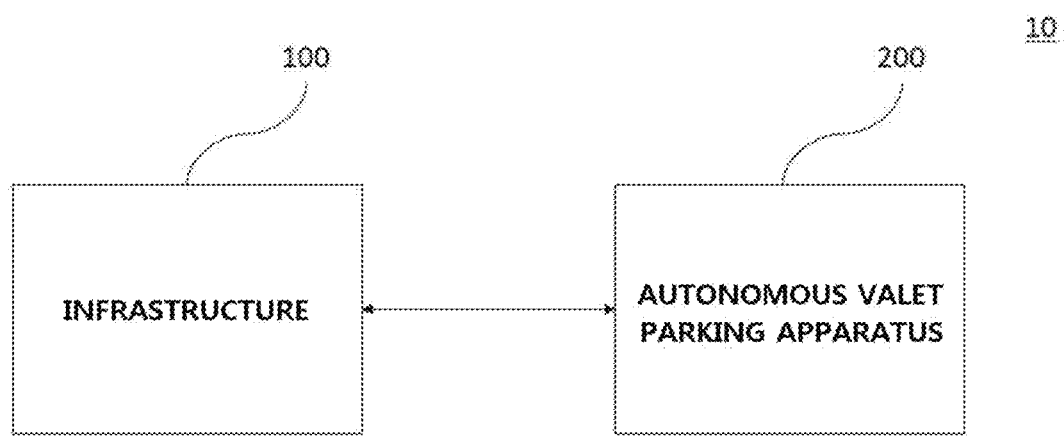
FIG. 1 is a diagram illustrating an automated valet parking system according to an embodiment of the present disclosure.

Herein below, various embodiments of the present disclosure are described in detail with reference to the accompanying drawings. The construction and operational effect of the present disclosure should be clearly understood from the following detailed description. Prior to describing the embodiments of the present disclosure in detail, it is noted that throughout the drawing the same components are denoted by the same reference numerals if possible. A detailed description about existing components and functions is omitted when the subject matter of the present disclosure may be obscured by the description.

It is also noted that terms used in the detailed description of the present disclosure are defined below.

The term "driver" refers to a person who uses an automated valet parking service provided by an automated valet parking system.

The term "driving authority" refers to the authority to perform vehicle operations. The term "vehicle operation" refers to an operation such as steering, accelerating, braking, gear shifting, vehicle starting, and door locking and unlocking of a vehicle.

The term "vehicle" refers to a vehicle having an autonomous valet parking feature.

The term "control center" refers to a facility that can monitor vehicles parked in a parking garage or facility, which determines a target position, a guide route, and a permitted driving area, and which transmits a driving start command, or an emergency stop command to a vehicle.

The term "infrastructure" refers to a parking facility or sensors installed in the parking facility. Alternatively, in some cases, the term "infrastructure" may refer to a control center that controls a parking lot gate, vehicles in a parking lot, and the like.

The term "target position" refers to an empty space available for parking. Alternatively, in a case where drivers leave a parking lot, the term "target position" may refer to a pickup zone where the drivers get in their vehicles.

The term "guide route" refers to a route along which a vehicle drives to reach a target position. For example, in a case of parking the vehicle, the guide route refers to a route along or according to which a vehicle needs to navigate from a drop-off zone to an empty space. For example, the guide route is provided in the form of instructions, for example, "driving forward a distance of 50 m and turning left at the corner".

The term "driving route" refers to a driving path along which a vehicle is driven.

The term "permitted driving area" refers to an area where a vehicle can drive in a parking lot. For example, the permitted driving area includes the driving route. The permitted driving area is defined with barrier walls, parked vehicles, parking lines, and the like.

FIG. 1 is a diagram illustrating an automated valet parking system according to an embodiment of the present disclosure. Referring to FIG. 1, an automated valet parking system 10 includes a parking infrastructure 100 and an autonomous valet parking apparatus 200.

The infrastructure 100 refers to an apparatus, facility or system for operating, managing, and controlling an automated valet parking system. For example, the infrastructure 100 may be a parking facility. According to an embodiment, the infrastructure 100 includes sensors, communication devices, alarm devices, display devices, and a server that controls those devices and sensors. Alternatively, in some cases, the term "infrastructure" may refer to a control center that controls a parking lot gate, vehicles in a parking lot, and the like.

The infrastructure 100 includes a transceiver for performing a communication and a processor for performing a computation. According to an embodiment, the infrastructure 100 may further include sensors for detecting surrounding objects and parameters. In the present disclosure, determinations and computations performed by the infrastructure 100 are performed by the processor.

The autonomous valet parking apparatus 200 refers to a vehicle that can perform autonomous valet parking. According to an embodiment, the autonomous valet parking apparatus 200 refers to a component or a set of components capable of performing autonomous valet parking.

Figure 2:
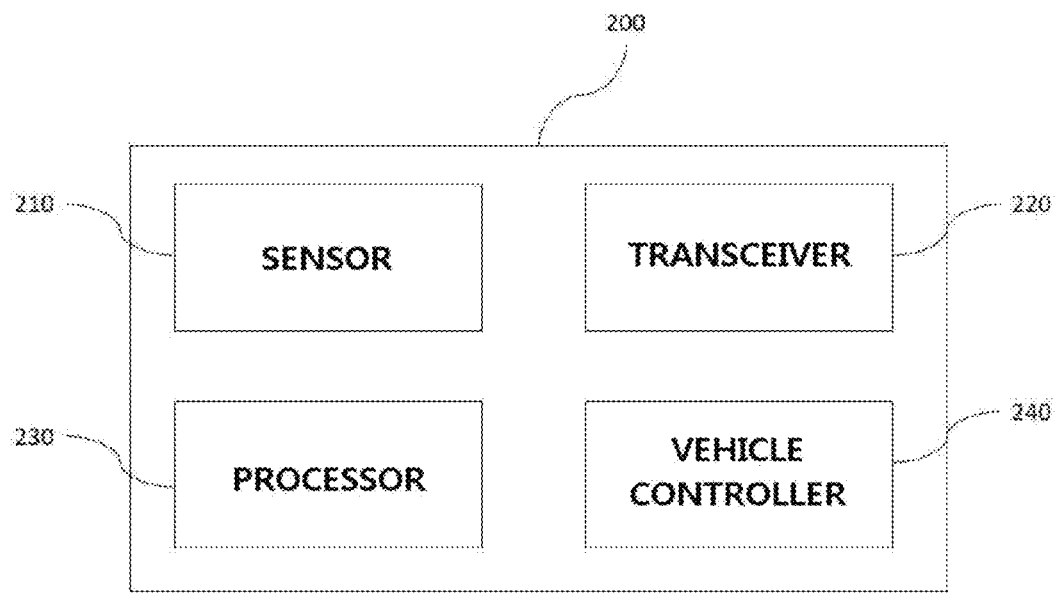
FIG. 2 is a diagram illustrating an autonomous valet parking apparatus according to an embodiment of the present disclosure.

FIG. 2 is a diagram illustrating an autonomous valet parking apparatus according to an embodiment of the present disclosure. Referring to FIG. 2, the autonomous valet parking apparatus (for example, a vehicle 200) includes a sensor 210, a transceiver 220, a processor 230, and a vehicle controller 240.

The sensor 210 monitors the surroundings of the autonomous valet parking apparatus 200. According to an embodiment, the sensor 210 measures the distance between the autonomous valet parking apparatus 200 and a specific object or detects a nearby object. For example, the sensor 210 may include at least one of the sensors selected from among an ultrasonic sensor, a RADAR sensor, a LIDAR sensor, a camera, an infrared sensor, a thermal sensor, and a millimeter wave sensor.

The sensor 210 transmits data resulting from sensing or from measurements to the transceiver 220 or to the vehicle controller 240.

The transceiver 220 exchanges data with the infrastructure 100. This communication is called vehicle-to-infra (V2I) communication. The transceiver 220 communicates the data with other vehicles. This communication is called vehicle-to-vehicle (V2V) communication. The V2I communication and the V2V communication are collectively called vehicle-to-everything (V2X) communication. According to an embodiment, the transceiver 220: receives data such as a target position, a guide route, a navigation route, a command, and the like from the infrastructure 100; processes the received data; and transmits the resulting data to the processor 230. The transceiver 220 transmits data collected and generated by the vehicle 220 to the infrastructure 100. According to an embodiment, the transceiver 220 exchanges data with a terminal device of the driver of the vehicle 200.

The transceiver 220 receives and transmits data by using a wireless communication protocol or a cable communication protocol. Examples of the wireless communication protocol include, but are not limited to, wireless LAN (WLAN), digital living network alliance (DLNA), wireless broadband (Wibro), world interoperability for microwave access (Wimax), global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSPDA), high speed uplink packet access (HSUPA), IEEE802.16, long term evolution (LTE), long term evolution-advanced (LTE-A), wireless mobile broadband service (WMBS), Bluetooth, infrared data association (IrDA), ultra-wideband (UWB), ZigBee, near field communication (NFC), ultra sound communication (USC), visible light communication (VLC), Wi-Fi, and Wi-Fi direct. Examples of the cable communication protocol include, but are not limited to, wired local area network (LAN), wired wide area network (WAN), power line communication (PLC), USB communication, Ethernet communication, serial communication, and optical/coaxial cable communication. Other protocols that support communication between devices fall within the definition of the communication protocol that is used in the present disclosure.

The processor 230 controls the overall operation of the vehicle 200. The processor 230 controls the vehicle controller 240 on the basis of the data transmitted from the sensor 210 and the transceiver 220. According to an embodiment, the processor 230 generates a control signal for adaptively controlling the vehicle controller 240 according to the data transmitted from the infrastructure 100 and transmits the control signal to the vehicle controller 240.

In other words, the processor 230 refers to a device that performs a series of computations or makes a series of determinations to control the vehicle 200 for the purpose of autonomous valet parking. The processor 230 may be a processor by which a program including instructions for performing automated valet parking is executed. Examples of the processor 230 include a central processing unit (CPU), a micro controller unit (MCU), an application specific integrated circuit (ASIC), a field programmable gate array (FPGA), and a graphic processing unit (GPU) but are not necessarily limited thereto.

The vehicle controller 240 controls the operation of the vehicle 200 according to the control signal issued by the processor 230. According to an embodiment, the vehicle controller 240 controls the vehicle 200 in response to the control signal transmitted from the processor 230. For example, the vehicle controller 240 controls various vehicle operations such as driving, stopping, resuming of driving, steering, accelerating, decelerating, parking, lamp lighting, alarm sounding, and the like.

It should be appreciated that the vehicle controller 240 can perform all the functions for controlling the operations of the vehicle 200. In other words, the vehicle controller 240 may include a driving unit, a braking unit, a steering unit, an acceleration unit, an alarm unit, and a lighting unit.

On the other hand, although not described herein, the operations and/or functions of the vehicle 200 described in the description herein are performed by the conjunction of one or more components selected from among the sensor 210, the transceiver 220, the processor 230, and the vehicle controller 240.

Figure 3:
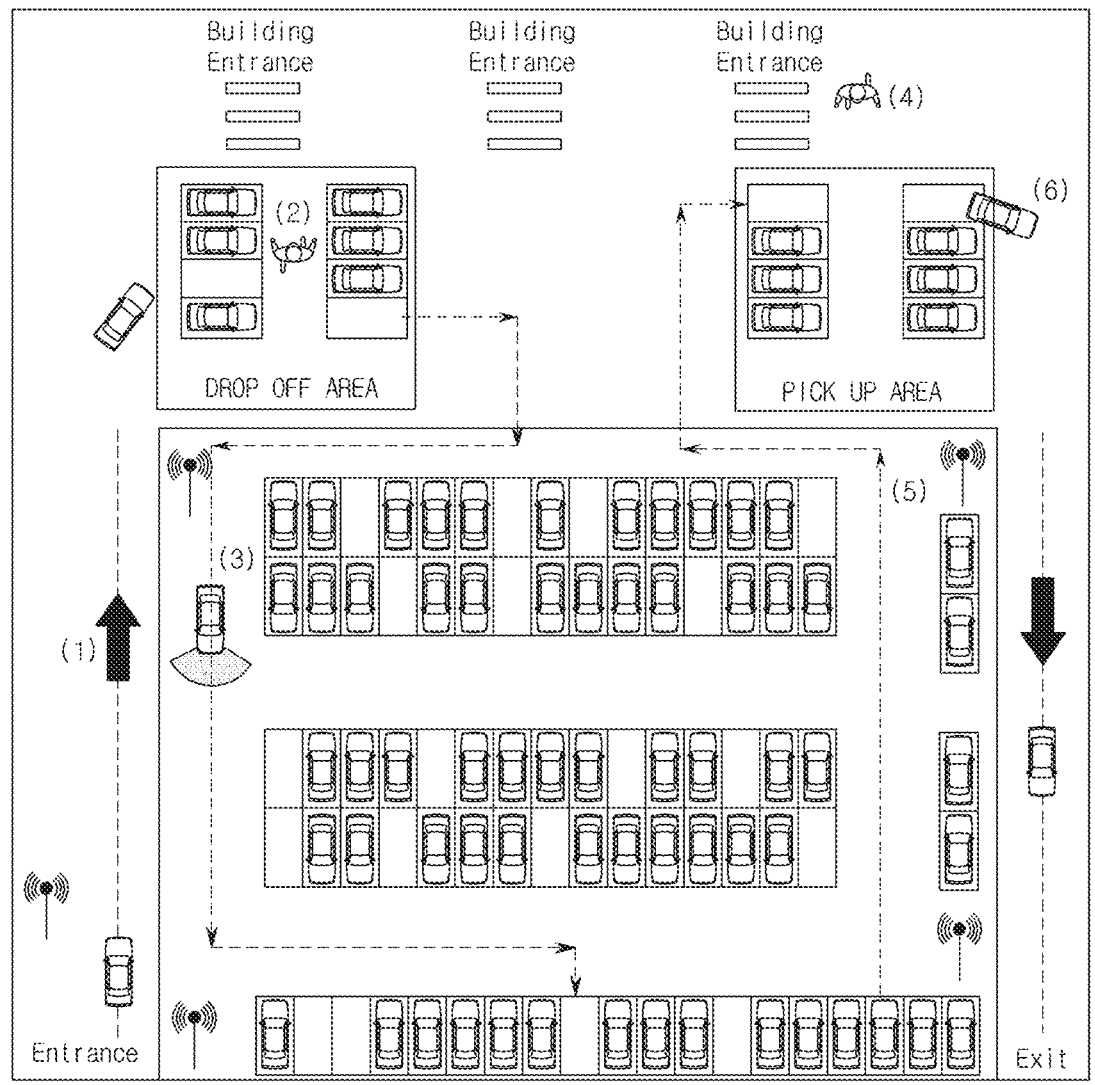
FIG. 3 is a conceptual diagram illustrating an automated valet parking system and method according to an embodiment of the present disclosure.

FIG. 3 is a conceptual diagram illustrating an automated valet parking system and a method according to one embodiment of the present disclosure.

Referring to FIG. 3, in step (1), a driver drives a vehicle to a drop-off zone in a parking lot.

In step (2), the driver leaves the vehicle at the drop-off zone and the authority to drive or control the vehicle is delegated to the infrastructure.

In step (3), the infrastructure searches for empty parking slots among all the parking slots in the parking lot and assigns a suitable empty parking slot among the empty parking slots to the vehicle. The infrastructure determines a guide route which guides the vehicle to the assigned empty parking slot. After the parking slot and the guide route are determined, the vehicle is autonomously self-driven along the guide route to reach the assigned parking slot and performs autonomous valet parking at the parking slot.

In step (4), the driver moves to a pickup zone where the vehicle picks up the driver when the driver wants to leave the parking lot.

In step (5), the infrastructure determines a suitable target position. For example, the suitable target position may be an empty parking slot of multiple parking slots within the pickup zone. The infrastructure determines a guide route which leads the vehicle to the target position. After the target position and the guide route are determined and transmitted to the vehicle, the vehicle is autonomously self-driven along the guide route to reach the target position and performs autonomous parking.

In step (6), the driver arrives at the pickup zone and takes over the authority to drive the vehicle. The driver drives the vehicle toward the exit of the parking lot.

FIGS. 4A and 4B are diagrams illustrating operations performed by a parking infrastructure and a vehicle for automated valet parking, according to an embodiment of the present disclosure.

In step (1), operations of the infrastructure and the vehicle to start automated valet parking are performed. The infrastructure identifies the driver and the vehicle and determines whether the driver and the vehicle are qualified. For example, the infrastructure determines whether the driver is a qualified driver by reading an identification number (ID) or a password input by the driver. In addition, the infrastructure determines whether the vehicle is a qualified vehicle by reading a vehicle identification number of the vehicle. The vehicle can turn on and off the engine by itself. The vehicle can turn on and off the power supply by itself. For example, a state in which the engine of the vehicle is turned off and the power supply is turned on is referred to as an accessory-on (ACC-On) state. The engine on/off and the power supply on/off of the vehicle are performed according to instructions transmitted from the infrastructure or automatically performed without depending on the instructions transmitted from the infrastructure. The vehicle can lock and unlock the doors by itself. The locking/unlocking of the vehicle doors is performed according to instructions transmitted from the infrastructure or is automatically performed without depending on the instructions from the infrastructure. When the vehicle proceeds to an autonomous parking step, the vehicle doors may be locked. In addition, the driving authority of the vehicle is delegated to the infrastructure from the vehicle. The driving authority means an authority to control vehicle operations. The vehicle operations include steering, accelerating, braking, gear shifting, ignition turning, and locking/unlocking vehicle doors. Since the driving authority of the vehicle is delegated to the infrastructure, the infrastructure takes complete control of the vehicle during the automated valet parking of the vehicle. Accordingly, the likelihood that an unintended operation of the vehicle occurs is lowered and vehicle accidents in the parking lot are prevented. However, in some cases, the driving authority may be partially delegated to the infrastructure so that the vehicle can still control some of the vehicle operations, or the driving authority may be shared by the vehicle and the infrastructure. For example, a braking operation may be performed when an emergency occurs during the autonomous valet parking procedure. Therefore, the vehicle may apply a brake without intervention of the infrastructure when the vehicle senses a danger with help of an ADAS sensor. In addition, the vehicle checks whether a person or animal is present in the vehicle. Since a parking duration from the completion of the autonomous valet parking to the discharging of the vehicle from a parking lot is long, if a person or animal is accidently left in the vehicle, the person or animal would be in danger. Therefore, it is important to ensure that the vehicle is empty before the vehicle is parked. Whether a person or animal is present in the vehicle may be checked with a sensor mounted on the vehicle. On the other hand, the driving authority is automatically returned to the driver from the infrastructure when the autonomous valet parking is finished.

An exit procedure is similar to the entering procedure described above. For exiting, a vehicle receives a pickup request. The driver (i.e., owner or user of the vehicle) makes the pickup request using a device (for example, a smartphone or a mobile terminal) that can communicate with the infrastructure. When the driver makes the pickup request, the driver transmits vehicle information and driver information to the infrastructure using a mobile terminal. The infrastructure determines whether a target vehicle of the pickup request is actually parked in the parking lot on the basis of the received vehicle information and driver information and checks whether the driver is a qualified driver.

When the vehicle receives the pickup request, the vehicle or the infrastructure checks whether there is a passenger in the vehicle and performs the next step when no passenger is present in the vehicle. When the driver sends the pickup request, the driving authority is delegated from the driver to the vehicle or the infrastructure. In other words, when the driver sends the pickup request, the driver loses the right to control the vehicle. In this case, the vehicle operates under control of its own control mechanism or the control of the infrastructure. For example, the vehicle doors are locked by the control of the vehicle or the infrastructure when the vehicle leaves the parking place and unlocked when the vehicle arrives at the pickup zone. When the vehicle arrives at the pickup zone, the driving authority is returned to the driver from the vehicle or the infrastructure.

However, in some cases, the driving authority may be partially delegated to the infrastructure from the vehicle. In this case, the vehicle still can control some operations of the vehicle. Alternatively, the driving authority may be shared by the vehicle and the infrastructure. After receiving the pickup request, the vehicle leaves the parking place upon receiving a pickup signal. Before leaving the parking place, the infrastructure turns on the ignition of the vehicle. The infrastructure transmits a notification that the vehicle is leaving the parking place and the vehicle moves to the driver.

In step (2), a process of determining a target position, a guide route, and a driving route is performed. The determination of the target position, the guide route, and the driving route is performed by the infrastructure. The target position, the guide route, and the driving route determined by the infrastructure are delivered from the infrastructure to the vehicle. The target position, the guide route, and the driving route determined by the infrastructure are delivered to the vehicle both when the vehicle enters and when the vehicle exits.

In step (3), an autonomous driving operation is performed in the parking lot. The autonomous driving of the vehicle includes driving, stopping, and resuming of driving. The autonomous driving of the vehicle is performed according to instructions transmitted from the infrastructure to the vehicle. Alternatively, the autonomous driving of the vehicle may be performed without relying on the instructions from the infrastructure. The vehicle can be autonomously self-driven to the target position along the guide route within a permitted driving area. During the driverless autonomous driving of the vehicle, the vehicle is controlled to drive at a preset speed or below. This preset speed may be a value transmitted from the infrastructure to the vehicle or may be a value stored in the vehicle. In addition, the vehicle is controlled not to deviate beyond an error margin from the given guide route when driving along the guide route. This preset error margin may be a value transmitted from the infrastructure to the vehicle or may be a value stored in the vehicle. In addition, the vehicle may turn with a predetermined minimum turning radius when it is necessary to turn during the autonomous driving along the guide route. This preset minimum turning radius may be a value transmitted from the infrastructure to the vehicle or may be a value stored in the vehicle. The vehicle is controlled not to exceed a predetermined maximum acceleration value when autonomously driving along the guide route. This preset maximum acceleration value may be a value transmitted from the infrastructure to the vehicle or may be a value stored in the vehicle.

In step (4), a position measurement operation is performed. The target of the position measurement may be a vehicle to be parked in a parking lot, an obstacle existing in the parking lot, or a vehicle that is parked in the parking lot. The infrastructure measures the position of the vehicle or the obstacle and stores the measured position in a database. The infrastructure identifies and detects vehicles or obstacles and monitors the safety of each of the plurality of vehicles in the parking lot. In addition, the infrastructure monitors the operating state of the vehicle that is performing autonomous parking after reaching the target position and transmits an instruction on the basis of the results of the monitoring. The vehicle measures its position. The vehicle transmits the measured position to the infrastructure. The error of the position measured by the vehicle needs to be within a predetermined error range. The predetermined error range is determined by the infrastructure. The vehicle detects obstacles present around the vehicle, measures the positions of the obstacles, and transmits the measured positions of the respective obstacles to the infrastructure. The communication between the vehicle and the infrastructure is performed at a predetermined frequency.

In step (5), an autonomous parking operation is performed by the vehicle. The autonomous parking refers to an operation in which the vehicle that has reached a location around or close to the target position without a driver enters into a target parking slot. The vehicle performs autonomous parking by sensing nearby obstacles or vehicles that are parked, with the help of a distance sensor mounted on the vehicle. Examples of the distance sensor mounted on the vehicle include an ultrasonic sensor, a RADAR sensor, a LIDAR sensor, and a camera.

In step (6), an emergency braking process is performed. The emergency braking of the vehicle is performed according to instructions transmitted from the infrastructure or may be performed on its own determination when the vehicle detects an obstacle. The infrastructure instructs the vehicle to apply an emergency brake when it is determined that an area around the vehicle is unsafe. When the infrastructure determines that the surroundings of the vehicle become safe after the emergency braking is performed, the infrastructure orders the vehicle to resume autonomous driving or autonomous parking. When the vehicle detects an obstacle, the vehicle applies an emergency brake on its own. In addition, the vehicle reports to the infrastructure the emergency braking that is performed by itself or the type or location of the obstacle which is the cause of the emergency braking. The vehicle reduces its speed according to a predetermined deceleration value preset for the emergency braking. This predetermined deceleration value is a value determined by the infrastructure or a value stored in the vehicle. The predetermined deceleration value may be determined according to the type of the obstacle, the position of the obstacle, and the distance between the vehicle and the obstacle. The vehicle resumes autonomous driving or autonomous parking upon receiving a resumption instruction for the autonomous driving or autonomous parking from the infrastructure. Alternatively, the vehicle resumes the autonomous driving or autonomous parking when it confirms that the obstacle is removed. The vehicle reports to the infrastructure of the resumption of autonomous driving or autonomous parking and of the removal of the obstacle.

In step (7), the automated valet parking procedure is finished. After the vehicle has completed autonomous driving and autonomous parking, the infrastructure issues a control release instruction to the vehicle. The vehicle can turn on and off the engine and turn on and off the power supply according to instructions received from the infrastructure or without depending on the instructions from the infrastructure. In addition, the vehicle can lock and unlock the vehicle doors according to instructions received from the infrastructure or without depending on the instructions from the infrastructure. Further, the vehicle can apply a parking brake according to instructions received from the infrastructure or without depending on the instructions from the infrastructure.

In step (8), an error control operation is performed. The error control is performed when an error occurs in communication between the vehicle and the infrastructure and/or when a mechanical error of the vehicle occurs. The infrastructure monitors communication between the infrastructure and the vehicle to detect whether a communication error occurs. The vehicle detects a communication error by monitoring the communication between the infrastructure and the vehicle. The vehicle detects whether a mechanical error occurs by monitoring operating states of built-in accessories including sensors mounted thereon. The vehicle detects the presence of a person or an animal in the vehicle and applies an emergency brake when the presence of a person or animal is detected. The vehicle resumes autonomous parking or autonomous driving according to instructions received from the infrastructure when the vehicle is in an emergency stop state. Alternatively, the vehicle may determine, by itself, whether the cause of the emergency braking is removed and resumes autonomous parking or autonomous driving when the cause of the emergency parking is removed.

Figure 5:
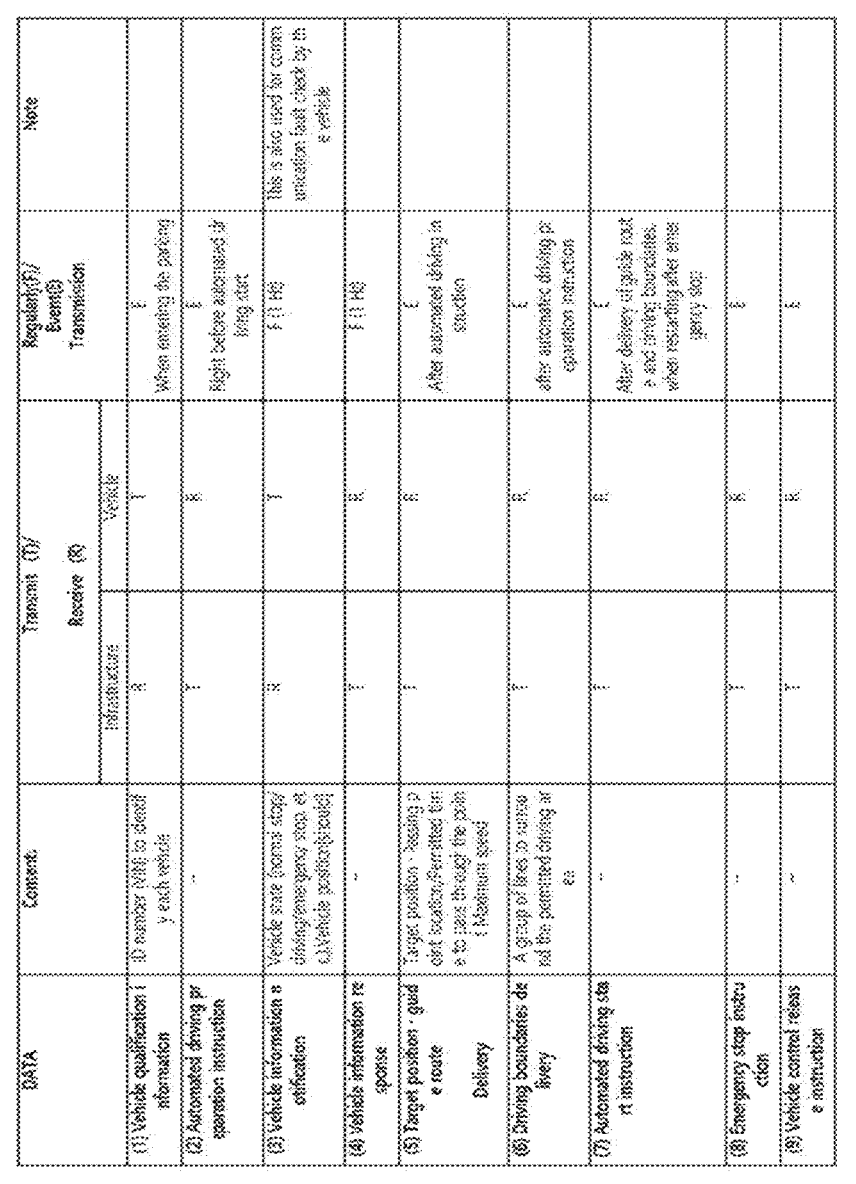

FIG. 5 is a diagram illustrating a communication process performed by a vehicle and a parking infrastructure for automated valet parking according to one embodiment of the present disclosure.

In step (1), vehicle qualification information is delivered from the vehicle to the infrastructure. The vehicle qualification information includes an identifier that distinguishes each vehicle from other vehicles. For example, the vehicle qualification information may be a unique vehicle number (for example, a license plate number) of the vehicle. The vehicle qualification information is transmitted at a stage in which the vehicle enters into a parking lot and the autonomous valet parking procedure is started (see (1) of FIG. 4A).

In step (2), an autonomous valet parking preparation instruction is transmitted from the infrastructure to the vehicle. The autonomous valet parking preparation instruction is transmitted before the autonomous driving of the vehicle begins.

In step (3), vehicle information is transmitted from the vehicle to the infrastructure. The vehicle information includes state information of the vehicle and position information of the vehicle. The state information of the vehicle includes whether the vehicle is driving, whether the vehicle is stopped, or whether the vehicle is in an emergency stop state. The vehicle information is transmitted periodically at a specific frequency (for example, 1 Hz which means once per second). The vehicle information is used as a parameter to determine whether a communication error has occurred between the vehicle and the infrastructure. For example, when the vehicle information does not reach the infrastructure at a specific time that is estimated according to the communication frequency, the infrastructure determines that an error has occurred in communication between the vehicle and the infrastructure.

In step (4), an acknowledgement of the reception of the vehicle information is transmitted from the infrastructure to the vehicle. The acknowledgement of the reception of the vehicle information is transmitted at the same frequency as the transmission of the vehicle information that is transmitted in step (3). Therefore, the acknowledgement of the reception of the vehicle information is used as a parameter to determine whether an error has occurred in communication between the vehicle and the infrastructure. For example, when the vehicle information does not reach the infrastructure at a specific time that is estimated according to the communication frequency, the infrastructure determines that an error has occurred in the communication between the vehicle and the infrastructure.

In step (5), a target position and a guide route are delivered from the infrastructure to the vehicle. The delivery of the target position and the guide route may be performed either before or after an autonomous valet parking start instruction is transmitted from the infrastructure to the vehicle.

In step (6), driving area boundary information is transmitted to the vehicle from the infrastructure. The driving area boundary information includes landmarks (for examples, lines demarcating parking slots, a central line, and lane boundary lines demarcating a driving lane) that mark the boundaries of a permitted driving area. The transmission of the driving area boundary information is performed after the autonomous valet parking preparation instruction is delivered. This driving area boundary information is transmitted from the infrastructure to the vehicle in the form of a parking lot map.

In step (7), the autonomous valet parking start instruction is transmitted from the infrastructure to the vehicle. The transmission of the autonomous valet parking start instruction is performed after the guide route and the driving area boundary information are delivered. Alternatively, the autonomous valet parking start instruction is transmitted when the cause of the emergency braking is removed.

In step (8), an emergency braking instruction is transmitted to the vehicle from the infrastructure.

In step (9), a vehicle control release instruction is transmitted to the vehicle from the infrastructure. The delivery of the vehicle control release instruction is performed after the vehicle is autonomously parked at a parking slot.

Figure 6:
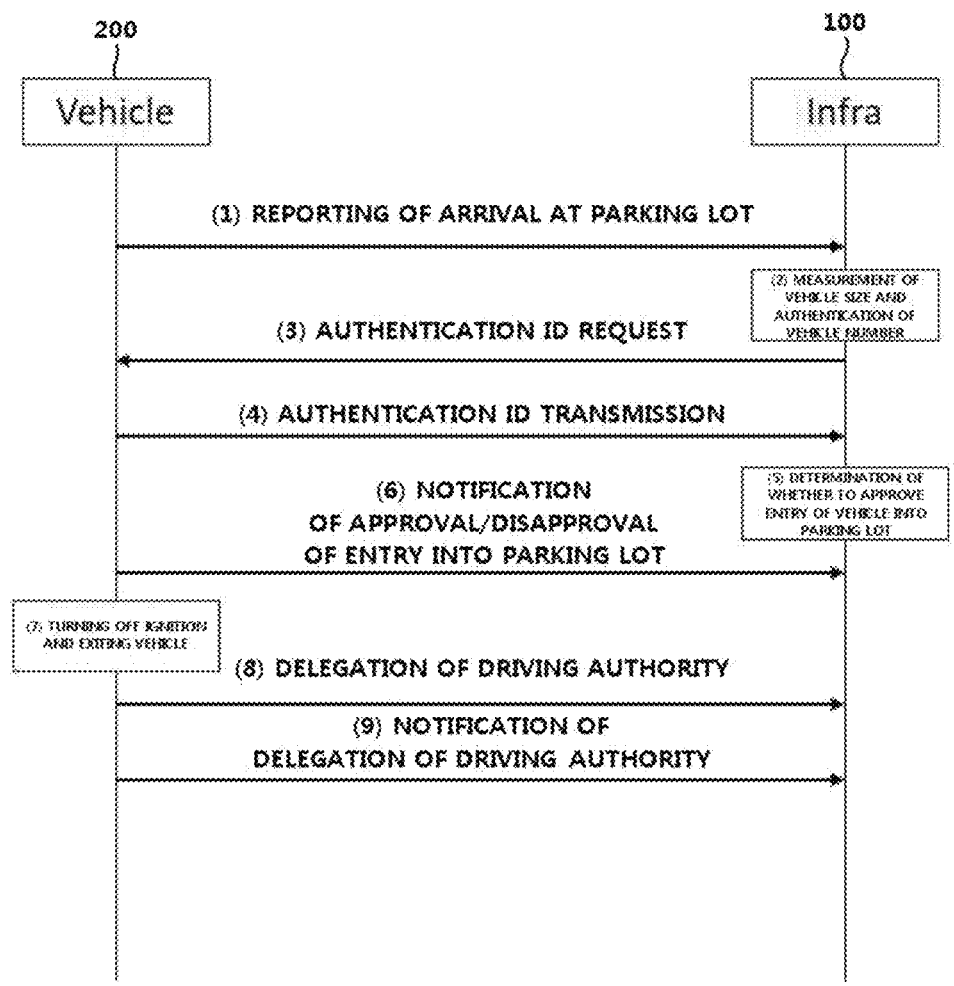
FIG. 6 is a diagram illustrating a communication process performed by a vehicle and a parking infrastructure for automated valet parking according to an embodiment of the present disclosure.

FIG. 6 is a diagram illustrating a communication process performed between a parking infrastructure 100 for automated valet parking and a vehicle 200.

In step (1), the vehicle 200 enters into a parking lot and stops at a predetermined stop position. This stop position may be an entrance gate of a parking lot. The vehicle 200 reports its arrival to the infrastructure 100. In step (2), the infrastructure 100 measures the dimensions of the vehicle 200 and authenticates the vehicle 200 on the basis of an authentication ID of the vehicle 200. In step (3), the infrastructure 100 transmits an authentication ID submission request to the vehicle 200. In step (4), the vehicle 200 transmits the authentication ID to the infrastructure 100. In step (5), the infrastructure 100 determines whether to allow entry of the vehicle 200 into the parking lot on the basis of the received authentication ID. In step (6), the infrastructure 100 notifies the vehicle whether the vehicle 200 is permitted to enter the parking lot according to the results of the authentication. For example, the infrastructure 100 displays a message indicating approval or disapproval of the entry of the vehicle into the parking lot on a display panel installed around the stop position. The driver drives the vehicle 200 to a drop-off zone when the entry of the vehicle into the parking lot is approved. In step (7), the driver turns off the ignition of the vehicle 200, gets off the vehicle 200, locks the vehicle doors, and leaves the drop-off zone. In step (8), the authority to drive the vehicle 200 is delegated from the vehicle 200 (or the driver) to the infrastructure 100. In addition, in step (9), the infrastructure 100 notifies the driver that it takes the authority to control the vehicle 200 in the parking lot. Such a notification is sent to a driver's smart device through a mobile communication network.

Figure 7:
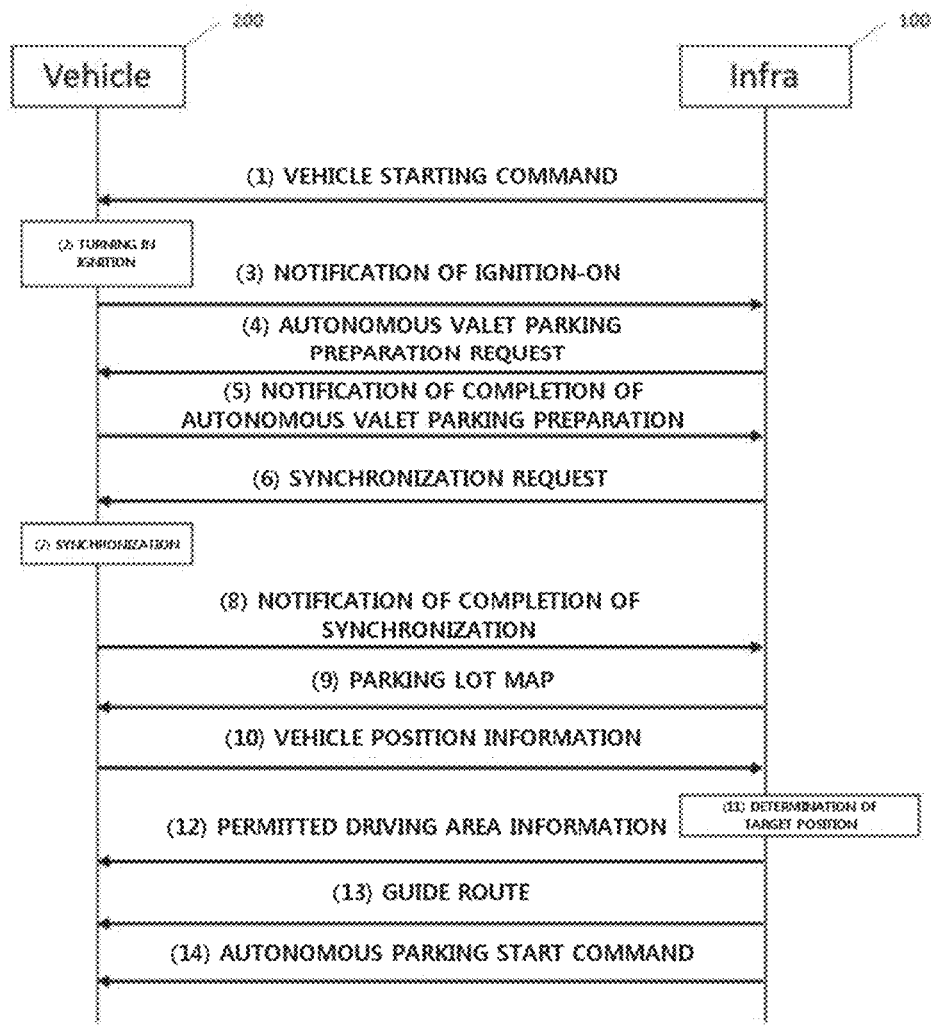
FIG. 7 is a diagram illustrating a communication process performed by a vehicle and a parking infrastructure for automated valet parking according to an embodiment of the present disclosure.

FIG. 7 is a diagram illustrating a communication process performed between a parking infrastructure 100 for automated valet parking and a vehicle 200.

In step (1), the infrastructure 100 transmits an ignition turning-on request to the vehicle 200. In step (2), the vehicle 200 turns on the ignition according to the ignition turning-on request transmitted from the infrastructure 100. In step (3), the vehicle 200 turns on the ignition and then notifies the infrastructure 100 that the ignition is turned on. In step (4), the infrastructure 100 transmits an automated valet parking preparation request to the vehicle 200. In step (5), the vehicle 200 transmits a reply to the automated valet parking preparation request to the infrastructure 100. The replay is a message of "OK" indicating that the preparation for automated valet parking is completed or a message of "NO" or "NG" (No Good) indicating that the preparation for automated valet parking is not completed. In step (6), the infrastructure 100 transmits a synchronization request to the vehicle 200. The synchronization request is a request for instructing synchronization of time such that the timer of the infrastructure 100 is synchronized with the timer of the vehicle 200. For example, the synchronization request includes information about the time indicated by the timer of the infrastructure 100. In step (7), the vehicle 200 performs the synchronization according to the synchronization request. In step (8), the vehicle 200 transmits a replay indicating that the synchronization is completed to the infrastructure 100. For example, until the synchronization between the infrastructure 100 and the vehicle 200 is completed, a plurality of synchronization requests may be transmitted from the infrastructure 100 to the vehicle 200. In step (9), the infrastructure 100 transmits parking lot map information to the vehicle 200. The parking lot map information includes landmark information. In step (10), the vehicle 200 estimates or calculates the position of the vehicle 200 on the basis of the transmitted landmark information. The vehicle 200 transmits the estimated position of the vehicle 200 to the infrastructure 100. In step (11), the infrastructure 100 determines a target position (for example, a parking place). In step (12), the infrastructure 100 transmits information on a permitted driving area to the vehicle 200. For example, the infrastructure 100 transmits boundary information of the permitted driving area to the vehicle 200. In step (13), the infrastructure 100 transmits a guide route to the vehicle 200. In step (14), the infrastructure 100 transmits an automated valet parking start instruction to the vehicle 200.

Figure 8:
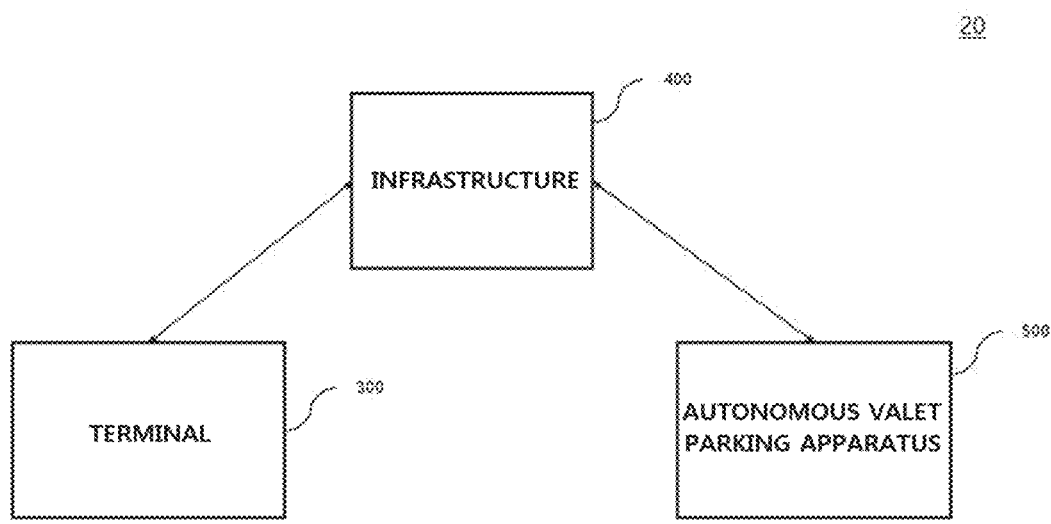
FIG. 8 is a view illustrating an automated valet parking system according to an embodiment of the present disclosure.

FIG. 8 is a diagram illustrating an automated valet parking system according to an embodiment of the present disclosure. Referring to FIGS. 1-8, an automated valet parking system 20 includes a user terminal 300, a parking infrastructure 400, and an autonomous valet parking apparatus 500.

The user terminal 300 is an electronic device capable of transmitting and receiving data over a network. For example, the user terminal 300 may be a mobile device such as a smartphone, a personal computer (PC), a tablet PC, or a personal digital assistance (PDA), a wearable device, a Kiosk, a point of sale (POS) terminal, or a computer but may not be necessarily limited thereto. The user terminal 300 may be an arbitrary device that can transmit and receive data.

The terminal 300 may be a terminal device used by the driver of the autonomous valet parking apparatus 500. The terminal 300 can communicate with the infrastructure 400. According to an embodiment, the terminal 300 transmits a pickup request to the infrastructure 400 so that the autonomous valet parking apparatus 500 can pick up the user or driver.

The terminal 300 includes a position measurement module. In other words, the terminal 300 can measure the current position of the terminal and calculate the moving speed of the terminal 300.

In other words, the terminal 300 includes a global navigation satellite system (GNSS) module. Examples of the GNSS include global positioning system (GPS), global navigation satellite system (Glonass), Beidou navigation satellite system (hereinafter, referred to as "Beidou"), Galileo, and European global satellite-based navigation system but are not necessarily limited thereto.

The infrastructure 400 and the autonomous valet parking apparatus 500 illustrated in FIG. 8 perform the functions of the infrastructure 100 and the autonomous valet parking apparatus 200 illustrated in FIG. 1, respectively. Hereinafter, functions and operations which have not been described above are described below.

The infrastructure 400 activates a pickup process for the autonomous valet parking apparatus 500 in response to the pickup request for the autonomous valet parking apparatus 500. According to an embodiment, the infrastructure 400 transmits a guide route that guides the autonomous valet parking apparatus 500 from the current parking space to the pickup zone to the autonomous valet parking apparatus 500.

The autonomous valet parking apparatus 500 performs autonomous driving from the current parking space on the basis of the guide route transmitted from the infrastructure 400 and reaches the pickup zone.

Figure 9:
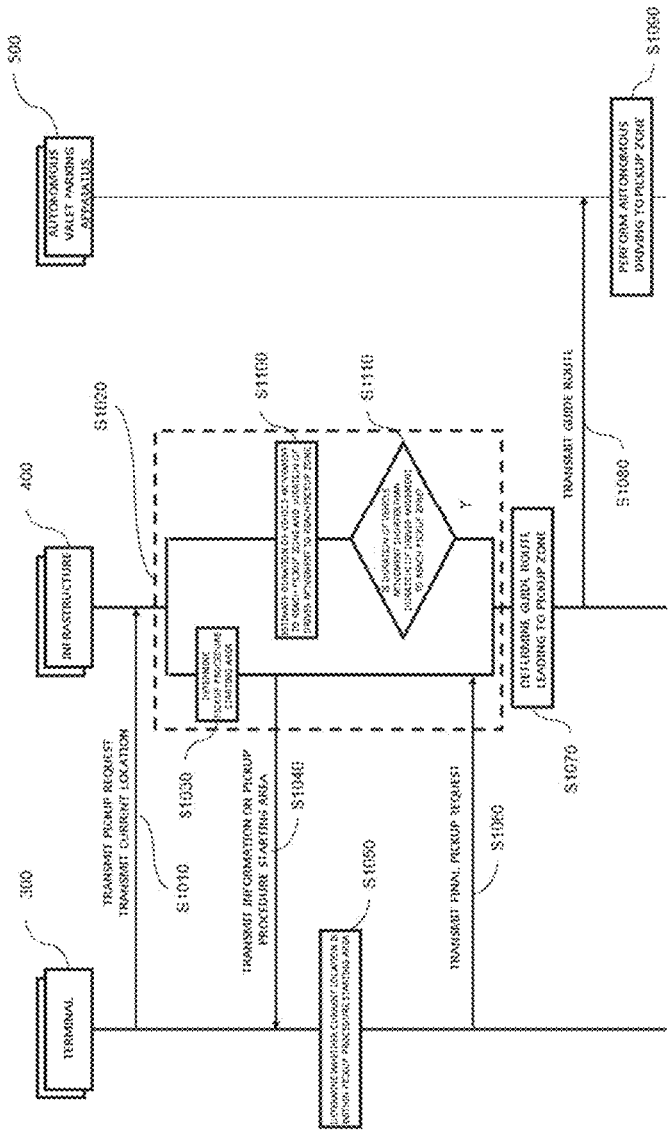
FIG. 9 is a data flowchart showing the flow of data inside an automated valet parking system according to an embodiment of the present disclosure.

FIG. 9 is a data flowchart showing the flow of data inside an automated valet parking system according to an embodiment of the present disclosure. Referring to FIGS. 1-9, a terminal 300 transmits a pickup request to a parking infrastructure 400 (S1010). According to an embodiment, the terminal 300 may transmit information on the current location of the terminal 300 besides the pickup request.

The infrastructure 400 determines whether a pickup condition is satisfied after receiving the pickup request (S1020). The pickup condition is a condition under which the infrastructure 400 can start the pickup process of the autonomous valet parking apparatus 500. When the pickup condition is satisfied, the infrastructure 400 transmits the guide route that guides the autonomous valet parking apparatus 500 to the pickup zone to the autonomous valet parking apparatus 500.

Hereinafter, an example of the pickup condition for starting the pickup process is described below.

The infrastructure 400 determines a pickup procedure starting area in response to the pickup request (S1030). The pickup procedure starting area is a location range condition for starting the pickup process of the autonomous valet parking apparatus 500. A time duration taken for the driver to move from the pickup procedure starting area to the pickup zone is similar to a time duration taken for the autonomous valet parking apparatus 500 to move from the parking place to the pickup zone. In other words, in a case where the pickup procedure is started when the driver is within the pickup procedure starting area, the driver can be picked up by the autonomous valet parking apparatus 500 as soon as the driver reaches the pickup zone without waiting.

According to an embodiment, the infrastructure 400 may determine the pickup procedure starting area on the basis of the distance between the parking place of the autonomous valet parking apparatus 500 and the pickup zone. In other words, the infrastructure 400 may determine the pickup procedure starting area on the basis of at least one type of information among the parking place, the pickup zone, map information of the parking facility, the number of pickup requests currently being processed, and the number of vehicles (i.e., autonomous valet parking apparatuses) existing within the pickup zone.

The infrastructure 400 may select the pickup procedure starting area from among multiple areas that are predefined and stored. The infrastructure 400 may determine the pickup procedure starting area on the basis of the distance to the pickup zone. In other words, the infrastructure 400 may determine an area that is within a range from a first distance to a second distance from the pickup zone as the pickup procedure starting area.

The infrastructure 400 transmits information on the determined pickup procedure starting area to the terminal 300. According to an embodiment, the infrastructure 400 transmits location information on the pickup procedure starting area to the terminal 300. In other words, the infrastructure 400 transmits a message to the terminal 300 for instructing the driver to go the pickup procedure starting area.

The terminal 300 may determine whether the current location of the terminal 300 is within the pickup procedure starting area (S1050).

The terminal 300 transmits a final pickup request to the infrastructure 400 when it is determined that the current location of the terminal 300 is within the pickup procedure starting area (S1060). According to the final pickup request, the infrastructure 400 initiates the pickup procedure. In other words, the pickup procedure is started when the infrastructure 400 receives the final pickup request.

On the other hand, according to an embodiment, the terminal 300 can make a change to the pickup procedure starting area such that the pickup procedure starting area may become farther away or closer to the pickup zone. In other words, the terminal 300 monitors at least either a movement pattern or a movement speed of the terminal 300 and adjusts the pickup procedure starting area according to the results of the monitoring.

When the movement pattern or the movement speed (moving phase) of the terminal 300 changes, the driver may not arrive to the pickup zone until an estimated time. In this case, when the pickup procedure starting area is not changed, the autonomous valet parking apparatus 500 may have to wait for the driver. Therefore, the pickup procedure starting area needs to be modified.

According to an embodiment, the terminal 300 may make a request for a new pickup procedure starting area with respect to the infrastructure 400 when the movement pattern of the terminal 300 changes. In other words, when the movement pattern of the terminal 300 changes at a location near the previously set pickup procedure starting area, there is a low probability that the driver can arrive at the pickup zone at the estimated arrival time. In this case, a request for a new pickup procedure starting area is made.

According to an embodiment, the terminal 300 modifies the pickup procedure starting area in a manner of setting a new pickup procedure starting area that is farther away from the pickup zone than the previous pickup procedure starting area when the moving phase of the terminal 300 becomes faster. In other words, the driver may arrive at the pickup zone earlier than the estimated arrival time when the moving phase of the terminal becomes faster. Therefore, in this case, by adjusting the pickup procedure starting area in a manner that the distance between the pickup procedure starting area and the pickup zone is increased or the distance between the pickup procedure starting area and the driver is reduced, the final pickup request can be transmitted earlier than the previously estimated time to the infrastructure.

The infrastructure 400 determines a guide route leading to the pickup zone in response to the final pickup request (S1070). According to an embodiment, the infrastructure 400 identifies the parking place of the autonomous valet parking apparatus 500 in the parking lot on the basis of the pickup request transmitted from the terminal 300 and determines the guide route on the basis of the location of the parking place and the location of the pickup zone.

The infrastructure 400 transmits the guide route to the autonomous valet parking apparatus 500 (S1080).

The autonomous valet parking apparatus 500 autonomously drives to the pickup zone on the basis of the guide route (S1090). In other words, the autonomous valet parking apparatus 500 starts a pickup procedure on the basis of the guide route.

Hereinafter, another example of the pickup condition for starting the pickup process is described below.

The infrastructure 400 calculates a duration of vehicle movement and a duration of driver movement (S1100). The duration of vehicle movement refers to a time that is required for the autonomous valet parking apparatus 500 to arrive at the pickup zone. The duration of the driver movement refers to a time that is required for the driver or the terminal 300 to arrive at the pickup zone.

According to an embodiment, the infrastructure 400 calculates the duration of vehicle movement on the basis of the location of the parking place of the autonomous valet parking apparatus 500 and the location of the pickup zone. In other words, the infrastructure 400 calculates the duration of vehicle movement on the basis of the location of the parking place, the location of the pickup zone, and the limit speed within the parking lot.

According to an embodiment, the infrastructure 400 calculates the duration of the driver movement on the basis of the current location of the terminal 300 and the location of the pickup zone. In other words, the infrastructure 400 calculates the duration of the driver movement on the basis of the current location of the terminal 300, the location of the pickup zone, and the moving phase (or speed) of the terminal 300.

The infrastructure 400 transmits the duration of vehicle movement and the duration of driver movement that results from the calculation, to the terminal 300.

The infrastructure 400 determines whether the pickup condition is satisfied on the basis of at least either the duration of vehicle movement or the duration of driver movement. When it is determined that the pickup condition is satisfied, the infrastructure 400 determines a guide route leading to the pickup zone and transmits the determined guide route to the autonomous valet parking apparatus 500 (S1070 and S1080). In other words, in this case, the pickup procedure is automatically started, even without the final pickup request issued by the terminal 300. This is because, although the terminal 300 tries to send the final pickup request, the terminal 300 cannot send the final pickup request for various reasons such as a communication error between the terminal 300 and the infrastructure 400 or malfunctioning of a position recognition function of the terminal 300. Even in such a case, the pickup procedure needs to continue.

According to an embodiment, the infrastructure 400 determines whether the duration of the vehicle movement is shorter than the duration of the driver movement up to the pickup zone (S1110). When the duration of the vehicle movement is shorter than the duration of the driver movement, the guide route is transmitted to the autonomous valet parking apparatus 500 (S1070 and S1080). In other words, the infrastructure 400 determines whether the communication with the terminal 300 is maintained. When it is determined that the estimated duration of the vehicle movement is shorter than the estimated duration of the driver movement and that the communication with the terminal 300 is not maintained, the infrastructure 400 determines a guide route leading to the pickup zone and sends the determined guide route to the autonomous valet parking apparatus 500.

According to an embodiment, when the estimated duration of vehicle movement is longer than the estimated duration of driver movement, the infrastructure 400 receives information on the current location of the terminal 300 and calculates the estimated duration of the driver movement on the basis of the received information. Next, the infrastructure 400 determines again whether the estimated duration of the vehicle movement is shorter than the newly estimated duration of the driver movement.

According to an embodiment, when a time corresponding to the estimated duration of vehicle movement passes from the time at which the pickup request is received by the infrastructure 400, the infrastructure 400 determines a guide route leading to the pickup zone and sends the guide route to the autonomous valet parking apparatus 500 (S1070 and S1080).

In one or more embodiments, the described functions may be implemented in the form of hardware, software, firmware, or any combination thereof. When implemented in the form of software, these functions may be stored on or transmitted to a computer-readable medium in the form of one or more instructions or codes. The computer-readable medium refers to any medium that can transfer a computer program from one computer to another. For example, it may be a communication medium or a computer-readable storage medium. The storage medium may be an arbitrary medium that can be accessed by a computer. The computer-readable media include, but is not limited to, RAMs, ROMs, EEPROMs, optical discs such as CD-ROM, magnetic disks, and any media that can be accessed by computers and which can be used to transfer a computer program in the form of instructions from one place to another. The computer-readable media are appropriately referred to as media that can be arbitrarily accessed by computers. For example, software can be transferred from a website, server or other remote sources through a cable or over a wireless channel. Examples of the cables include coaxial cable, fiber optic cable, twisted pair cable, and digital subscriber line (DSL). Examples of the wireless channel include infrared frequency waves, radio frequency waves, and ultrahigh frequency waves. In this case, the coaxial cable, the fiber optic cable, the twisted pair cable, the DL, and the wireless channels fall within the definition of the medium. The disks or discs include a compact disc (CD), a laser disc (LD), an optical disc (OD), a digital versatile disc (DVD), a floppy disk (FD), and a blue-ray disc. Discs generally refer to media from which data is optically read and disks refer to media from which data is magnetically read. Combinations of the above-mentioned media also fall within the definition of the computer-readable medium.

When embodiments are implemented as program code or code segments, the code segment may be a procedure, function, subprogram, program, routine, subroutine, module, software package, class, instructions, data structures, program command strings, or an arbitrary set of program command strings. One code segment may relate to another code segment or a hardware circuit in a manner of transmitting and receiving information, data, arguments, parameters, or memory content. Information, arguments, parameters, data, and the like may be delivered, sent, or transmitted using any suitable means such as memory sharing, message delivery, token delivery, network transmission, and the like. In addition, in some respects, steps and/or operations of a method or algorithm may reside on a mechanically readable medium and/or a computer-readable medium in the form of a combination or set of one or more codes and/or one or more instructions that can be integrated into a computer program product.

When implemented as software, the techniques described herein can be implemented as modules (for example, procedures, functions, and the like) that perform the functions described herein. Software codes may be stored in a memory unit and may be executed by a processor. The memory unit may be embedded in a processor or may be provided outside a processor. In this case, the memory unit may be communicatively connected with the processor by various means known in the art.

When implemented as hardware, processing units may be implemented as one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, electronic devices designed to perform the functions described herein, or any combination of these.

The above-described embodiments do not cover all possible combinations of components and/or methods to implement the present disclosure. Thus, a person of ordinary skill in the art should appreciate that many further combinations and substitutions of components and/or methods in various embodiments are possible. Accordingly, the above-described embodiments cover all such alterations, modifications, and variations that fall within the spirit and scope of the appended claims. Moreover, as to the scope of the terms "comprises" used in the detailed description or the appended claims, it is noted that it is similarly interpreted as "comprising" that is used as a transitional word in the claims.

As used herein, the term "infer" or "inference" generally refers to a process of determining or inferring a state of a system, environment, and/or user from a set of observations of events and/or data. Inferring can be used to identify a specific situation or action, or can generate a probability distribution of certain states, for example. Inferring is probabilistic. In other words, inferring may mean a calculation of a probability distribution of those states, based on study on data and events. Inferring may involve techniques used to construct a higher-level event from a set of events and/or data. The inference refers to a process of inferring new events or actions from a set of observed events and/or stored event data, determining whether events are closely correlated in time, and determining whether the events and data come from one or several events and data sources.

Moreover, terms such as "component", "module", and "system" used herein may refer to, not necessarily, computer entities such as hardware, firmware, any combination of hardware and software, software, and a software program being executed. For example, the term "component" may refer, not necessarily, to a process running on a processor, a processor, an object, an executable execution thread, a program, and/or a computer. By way of illustration, both an application running on a computing device and the computing device itself may fall within the definition of the component. One or more components may reside within a process and/or an execution thread. One or more components may be collectively provided in one computer or distributed in two or more computers. In addition, these components can be executed on various computer readable media having various data structures stored thereon. Components can communicate a signal containing one or more data packets (for example, data from an arbitrary component that interacts with a local system, a component of a distributed system, and/or other systems on the basis of a signal that is transmitted over a network such as Internet) with a local and/or remote process.

What is claimed is:

1. An apparatus for automated valet parking, the apparatus comprising:
    a processor configured to perform a computation; and
    a transceiver configured to transmit and receive data,
    wherein the apparatus receives a pickup request for a vehicle, determines whether a pickup condition is satisfied after receiving the pickup request, and transmits to the vehicle a guide route that guides the vehicle from a parking space to a pickup zone when it is determined that the pickup condition is satisfied,
    wherein the apparatus determines a pickup procedure starting area on the basis of a location of the parking place of the vehicle and a location of the pickup zone, transmits information on the pickup procedure starting area to a terminal, and determines that the pickup condition is satisfied in a case where the apparatus receives a final pickup request from the terminal, and
    wherein the pickup procedure starting area is an area where the terminal needs to transmit the final pickup request to the apparatus.

2. The apparatus according to claim 1, wherein the apparatus estimates a duration of the vehicle movement up to the pickup zone on the basis of the location of the parking place of the vehicle and the location of the pickup procedure starting area, estimates a duration of the driver movement up to the pickup zone on the basis of a current location of the terminal and the location of the pickup zone, and determines whether the pickup condition is satisfied on the basis of the estimated duration of the vehicle movement and the estimated duration of the driver movement.

3. The apparatus according to claim 2, wherein the apparatus determines that the pickup condition is satisfied in a case where the estimated duration of the vehicle movement is shorter than the estimated duration of the driver movement.

4. The apparatus according to claim 2, wherein the apparatus determines whether communication between the apparatus and the terminal is normally maintained and determines that the pickup condition is satisfied in a case where the estimated duration of the vehicle movement is shorter than the estimated duration of the driver movement and the communication between the apparatus and the terminal is not normally maintained.

5. An automated valet parking method performed using a parking infrastructure and a terminal, the method comprising:
    receiving, by the infrastructure, a pickup request for a vehicle;
    determining, by the infrastructure, whether the pickup condition is satisfied after receiving the pickup request; and
    transmitting to the vehicle, by the infrastructure, a guide route that guides the vehicle from a parking place of the vehicle to a pickup zone, in a case where it is determined that the pickup condition is satisfied,
    wherein the determining comprises
    determining, by the infrastructure, a pick procedure starting area on the basis of a location of the parking place of the vehicle and a location of the pickup zone and transmitting information on the pickup procedure starting area to the terminal,
    transmitting, by the terminal, a final pickup request to the infrastructure when a current location of the terminal is within the pickup procedure starting area, and
    determining that the pickup condition is satisfied in a case where the infrastructure receives the final pickup request, and
    wherein the pickup procedure starting area is an area where the terminal needs to transmit the final pickup request to the infrastructure.

6. The method according to claim 5, wherein the determining further comprises:
    modifying, by the terminal, the pickup procedure starting area according to a monitoring result by monitoring at least either a movement pattern of the terminal or a moving phase of the terminal.

7. The method according to claim 6, wherein the modifying comprises:
    making a request, by the terminal, for information on a new pickup procedure starting area when the movement pattern of the terminal changes; and
    determining, by the infrastructure, the new pickup procedure starting area and transmitting the information on the new pickup procedure starting area to the terminal.

8. The method according to claim 6, wherein the modifying comprises:
    adjusting the pickup procedure starting area such that a distance from the pickup procedure starting area to the pickup zone is increased when the moving phase of the terminal becomes faster; and
    adjusting the pickup procedure starting area such that the distance from the pickup procedure starting area to the pickup zone is decreased when the moving phase of the terminal becomes slower.

9. The method according to claim 5, wherein the determining comprises:
    calculating, by the infrastructure, an estimated duration of the vehicle movement up to the pickup zone on the basis of the location of the parking place of the vehicle and the location of the pickup zone;
    calculating, by the infrastructure, an estimated duration of driver movement up to the pickup zone on the basis of the current location of the terminal and the location of the pickup zone; and
    determining whether the pickup condition is satisfied on the basis of the estimated duration of the vehicle movement and the estimated duration of the driver movement.

10. The method according to claim 9, wherein the determining further comprises:
    determining, by the infrastructure, that the pickup condition is satisfied in a case where the estimated duration of the vehicle movement is shorter than the estimated duration of the driver movement.

11. The method according to claim 9, wherein the determining further comprises:
    determining, by the infrastructure, whether communication with the terminal is normally maintained; and
    determining, by the infrastructure, that the pickup condition is satisfied in a case where the estimated duration of the vehicle movement is shorter than the estimated duration of the driver movement and the communication with the terminal is not normally maintained.

12. The method according to claim 5, further comprising: transmitting, by the infrastructure, a pickup signal for turning on an ignition of the vehicle.

13. The method according to claim 12, further comprising:
   delegating a driving authority for the vehicle from the driver to the infrastructure after the pickup request is transmitted to the vehicle; and
   delegating the driving authority for the vehicle from the infrastructure to the driver of the vehicle when the vehicle arrives at the pickup zone.

14. The method according to claim 13, further comprising:
   locking doors of the vehicle, by the infrastructure, when the vehicle leaves the parking place; and
   unlocking the doors of the vehicle, by the infrastructure, when the vehicle arrives at the pickup zone.

15. A non-transitory computer-readable recording medium storing a computer program for executing an automated valet parking method, the program to direct a processor to perform acts of:
   receiving a pickup request for a vehicle;
   determining whether the pickup condition is satisfied after receiving the pickup request; and
   transmitting to the vehicle a guide route that guides the vehicle from a parking place of the vehicle to a pickup zone, in a case where it is determined that the pickup condition is satisfied,
   wherein the determining comprises
      determining a pick procedure starting area on the basis of a location of the parking place of the vehicle and a location of the pickup zone and transmitting information on the pickup procedure starting area to the terminal,
      receiving a final pickup request from the terminal that is located in the pickup procedure starting area, and
      determining that the pickup condition is satisfied in a case where the infrastructure receives the final pickup request, and
   wherein the pickup procedure starting area is an area where the terminal needs to transmit the final pickup request to the infrastructure.

\* \* \* \* \*